United States Patent [19]

Kohlpaintner et al.

[11] Patent Number: 5,085,622

[45] Date of Patent: Feb. 4, 1992

[54] SLIDING ROOF AND/OR SLIDING-LIFTING ROOF FOR MOTOR VEHICLES

[75] Inventors: Georg Kohlpaintner, Martinsried; Horst Bienert, Gauting, both of Fed. Rep. of Germany

[73] Assignee: Webasto AG Fahrzeugtechnik, Stockdorf, Fed. Rep. of Germany

[21] Appl. No.: 489,547

[22] Filed: Mar. 7, 1990

[30] Foreign Application Priority Data

Mar. 11, 1989 [DE] Fed. Rep. of Germany ....... 3907932

[51] Int. Cl.$^5$ .............................................. B60J 7/05
[52] U.S. Cl. ..................................... 296/222; 296/224; 296/221; 292/266; 248/309.2; 403/12; 29/464; 29/281.5
[58] Field of Search .............. 296/216, 221–223, 296/224; 403/12, 85; 29/464, 467, 271, 281.5; 248/309.2; 16/319, 352; 292/263, 265, 266

[56] References Cited

U.S. PATENT DOCUMENTS

| 721,318 | 2/1903 | Mohlenhoff | 292/266 |
|---|---|---|---|
| 1,716,356 | 6/1929 | Thompson | 292/263 |
| 4,223,943 | 9/1980 | Van Hulle et al. | 296/224 |
| 4,332,416 | 6/1982 | Lutz et al. | 296/216 |
| 4,466,657 | 8/1984 | Kaltz et al. | 296/223 X |
| 4,601,091 | 7/1986 | Grimm et al. | 29/464 X |
| 4,618,176 | 10/1986 | Farmont | 292/263 |
| 4,624,492 | 11/1986 | Vidas | 292/263 |
| 4,647,104 | 3/1987 | Kohlpaintner et al. | 296/221 |
| 4,647,106 | 3/1987 | Furst | 296/223 |
| 4,652,045 | 3/1987 | Hanley et al. | 296/223 X |
| 4,664,439 | 5/1987 | Schaetzler et al. | 296/213 |
| 4,671,565 | 6/1987 | Grimm et al. | 296/223 X |
| 4,987,671 | 1/1991 | Clausen-Schaumann | 296/216 X |

FOREIGN PATENT DOCUMENTS

0039319 2/1987 Japan ................................. 296/216

*Primary Examiner*—Dennis H. Pedder
*Attorney, Agent, or Firm*—Sixbey, Friedman, Leedom & Ferguson

[57] ABSTRACT

A sliding roof and/or a sliding-lifting roof for motor vehicles in which an adjustment mechanism is provided that aligns the guide blocks or the mounting mechanism coupled to it in the closed or zero position of the cover of the roof. For this purpose, a link part connected to the cover is fixed in the zero position, for example, with the help of a front hold-down device, with respect to a guide rail in the lengthwise direction, preferably, by a positively locking connection while, near the mounting mechanism or the guide block there is provided a through-opening in the link part which is associated with, for example, a fitting recess on the mounting mechanism. With the help of an adjustment part, the fitting recess is aligned flush with the through-opening on the link part and, in doing so, the mounting mechanism or the guide block is aligned in the predetermined zero position relative to the cover or to the link part of same.

19 Claims, 1 Drawing Sheet

SLIDING ROOF AND/OR SLIDING-LIFTING ROOF FOR MOTOR VEHICLES

BACKGROUND OF THE INVENTION

The invention relates quite generally to a motor vehicle roof that can be made in the form of a sliding roof and/or a sliding-lifting roof. In such a motor vehicle roof, a cover is provided that is guided on lateral guide rails that can be lowered at its rear end from a position closing an opening in a fixed roof part by a mounting mechanism, such as a tilt-out mechanism, and then slid underneath the fixed roof part or, optionally, can be tilted upwardly so that its rear end is disposed above the fixed roof part, and wherein both sides of the cover are provided with a front and a rear hold-down device near the front and rear edge of the cover, each hold-device also interacting with guideways on the guide rails for positionally aligning the cover relative to the fixed roof part in the closed position of the cover.

A motor vehicle sliding-lifting roof of the type mentioned above is known, for example, from U.S. Pat. No. 4,647,104. To align the cover and the tilt-out mechanism relative to a drive mechanism in the closed position of the cover, i.e., in the so-called zero position setting in a manner not shown or described in the indicated patent or otherwise publicly known, previously an adjustment pin was used that goes through the tilt-out mechanism and interacts with suitable engagement parts on the cover.

Such an opening going through the tilt-out mechanism weakens it so that the mechanism must be dimensioned accordingly. Furthermore, difficulties arise when such a mechanism is used in a sliding roof constructed to be flat and in which the tilt-out mechanism is to occupy as little space as possible in height. Still greater difficulties result in sliding roofs with a sliding inside roof headliner that is moved as a function of the movement of the cover of the sliding roof, for which purpose the sliding inside roof headlining may be, for example, slaved to the cover by a rack and pinion and toothed wheel gear that also must be placed near the tilt-out mechanism.

SUMMARY OF THE INVENTION

The invention, thus, has a primary object of providing a sliding roof and/or a sliding-lifting roof for motor vehicles in which, in an easily accessible manner, a zero position adjustment can be performed in a way that is as structurally simple as possible.

According to the invention, in a sliding roof and/or a sliding-lifting roof for motor vehicles with a cover of the initially-mentioned type, the respective front hold-down device, in the closed position of the cover, is fixed so as to be unable to slide in the lengthwise direction of the roof and the mounting mechanism is alignable by an adjustment mechanism relative to the cover, which cannot shift in the lengthwise direction due to the fixing of the hold-down device.

In the motor vehicle sliding roof according to the invention, the cover is held in the closed or zero position so as not to slide lengthwise, for example, with the help of the respective front hold-down device, so that, to align the cover and mounting mechanism, it is sufficient to align the mounting mechanism relative to the positionally fixed cover. In this way, the adjustment mechanism is simplified and openings going through the mounting mechanism can be eliminated, so that the mounting mechanism is weakened only insignificantly with respect to rigidity and, further, access to the adjustment mechanism is unimpeded by other parts of the motor vehicle sliding roof, such as a guide block. Thus, work for the zero position adjustment of the motor vehicle sliding roof is also simplified, which is advantageous, especially, with respect to automated assembly.

Preferably, the adjustment mechanism is made from an opening going through the cover near the mounting mechanism, and an adjustment part, such as an adjustment pin, which can be inserted through this opening, and then works together with an associated fitting recess in the mounting mechanism so that, when the adjustment part lies in the fitting recess and engages in the opening going through the cover, the mounting mechanism and drive mechanisms connected to it are aligned relative to the cover with positional coordination in the predetermined zero position.

Preferably, the through-opening is made on links provided on both sides of the cover, and the through-opening, preferably, has a quadrilateral cross section, while the fitting recess on the mounting mechanism is, advantageously, in the form of a U-shaped indentation. With such a design, an adjustment pin with a cross section that is similarly quadrilateral is used as the adjustment part. Preferably, the fitting recess is provided on the top side of the mounting mechanism, so that the recess can be provided, advantageously, from a manufacturing engineering viewpoint, on the mounting mechanism.

Preferably, to positionally fix the cover in its closed position, the respective front hold-down devices are made so that they lock positively in the guideways on the guide rail, and the respective hold-down devices can be provided, for example, with a quadrilateral cross section.

It is essential to the motor vehicle sliding roof according to the invention that no opening going through the mounting mechanism is needed for the zero position adjustment, so that the mounting mechanism and the working parts interacting with it, such as guide blocks and the like, can be made in a space-saving way and, thus, the roof can have a low height as well as a roof adjustment mechanism which has unimpeded access, even with a sliding inside roof headlining with a rack and pinion and a toothed wheel gear. The adjustment mechanism in the motor vehicle sliding roof according to the invention can, thus, be used in a versatile way and can be used in sliding roofs and in sliding-lifting roofs with and without a sliding inside roof headlining.

DETAILED DESCRIPTION OF THE PREFERRED EMBODIMENT

To explain the invention, in the description below a sliding-lifting roof for motor vehicles designated overall by 1 is used as an example.

Figure 1:
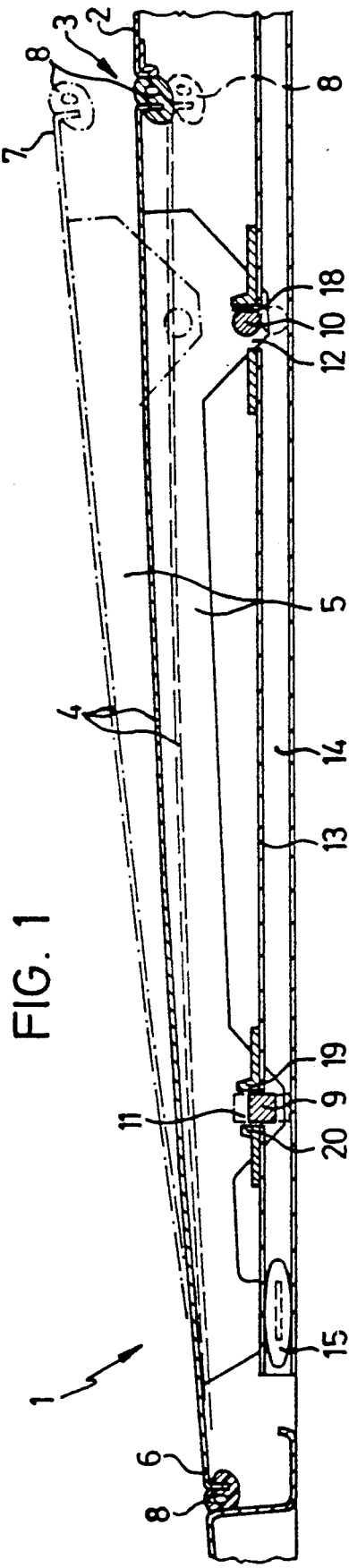
FIG. 1 is a longitudinal sectional view of a motor vehicle sliding roof, in which the cover is represented in solid lines in the closed position, in dashed lines in the position with its rear edge lowered and in dot-dash lines in its tilted-out position.

With reference to FIG. 1, a roof opening 3 is provided in a stationary roof part 2. In this roof opening 3, there is placed a cover 4 of sliding-lifting roof 1 that is carried by a link part 5. The link part 5 is attached to cover 4 on both longitudinal sides of cover 4. In the side view shown in FIG. 1, the parts on only one longitudinal side of cover 4 can be seen but the unseen side corresponds in mirror-image fashion.

On the front and rear ends of cover 4, which are designated by 6 and 7, diagrammatically indicated seals 8 are provided. To each link part 5, a peg-shaped, front hold-down device 9 is attached near front end 6 and another peg-shaped, rear hold-down device 10 is attached near rear end 7. Front hold-down device 9 and rear hold-down device 10 are each allocated to a front opening 11 and a rear opening 12 on the top side of a stationary guide rail 13 which defines a guide channel 14. In guide channel 14, for example, a front guide shoe 15 is guided to slide and is also attached to the link part 5 that carries cover 4. Near rear end 7 of cover 4, a mounting mechanism 16 is disposed that is shown in more detail in FIG. 2 and is explained in more detail in connection with this figure. This mounting mechanism 16 interacts with a link slot 17 in link part 5.

In the example of a sliding-lifting roof 1, the essential main positions of cover 4 are diagrammatically illustrated in FIG. 1. Cover 4 is shown in its closed position, i.e., the so-called zero position, in solid lines in FIG. 1. In this closed position, the top side of cover 4 lies flush with stationary roof part 2 and roof opening 3 is closed tightly by interaction of cover 4 with seals 8. Front hold-down device 9, which has a quadrilaterally shaped lug, preferably of square cross section, is fixed so as not to slide in the lengthwise direction in allocated opening 11, i.e., peg-shaped, front hold-down device 9 is received in a positive locked way in front opening 11. Peg-shaped, rear hold-down device 10 lies against a rear guide part 18 of rear opening 12. As shown in FIG. 1, this peg-shaped, rear hold-down device 10 is received with longitudinal play in the allocated rear opening 12.

The arrangement of cover 4, link part 5 and front hold-down device 9 and rear hold-down device 10 are shown, via dashed lines, in a position in which the rear edge of cover 4 is lowered below stationary roof part 2. In this lowered position of cover 4, the front hold-down device 9 lies on the base of guide channel 14 formed by guide rail 3, and rear hold-down device 10 also lies on the base of guide channel 14. In this lowered position of cover 4, it can be moved in a forward-rearward lengthwise direction, i.e., to the right as seen in FIG. 1, underneath the stationary roof part 2, so that roof opening 3 is gradually exposed.

The arrangement of cover 4, link part 5 front hold-down device 9 and rear hold-down device 10 is shown, via dot-dash lines, in the tilted-out position of sliding-lifting roof 1. In this tilted-out position of cover 4, its rear end 7 points upwardly above stationary roof part 2, and a gap is opened between stationary roof part 2 and rear end 7 of cover 4, for example, for ventilation purposes. In the tilted-out position of cover 4, rear hold-down device 10 is raised upward out of the opening 12, and the front hold-down device 9 is pushed upward somewhat, out of the zero position represented by the solid line, and is held between guide parts 19, 20, which project upwardly from guide rail 13 in the area of front opening 11.

Figure 2:
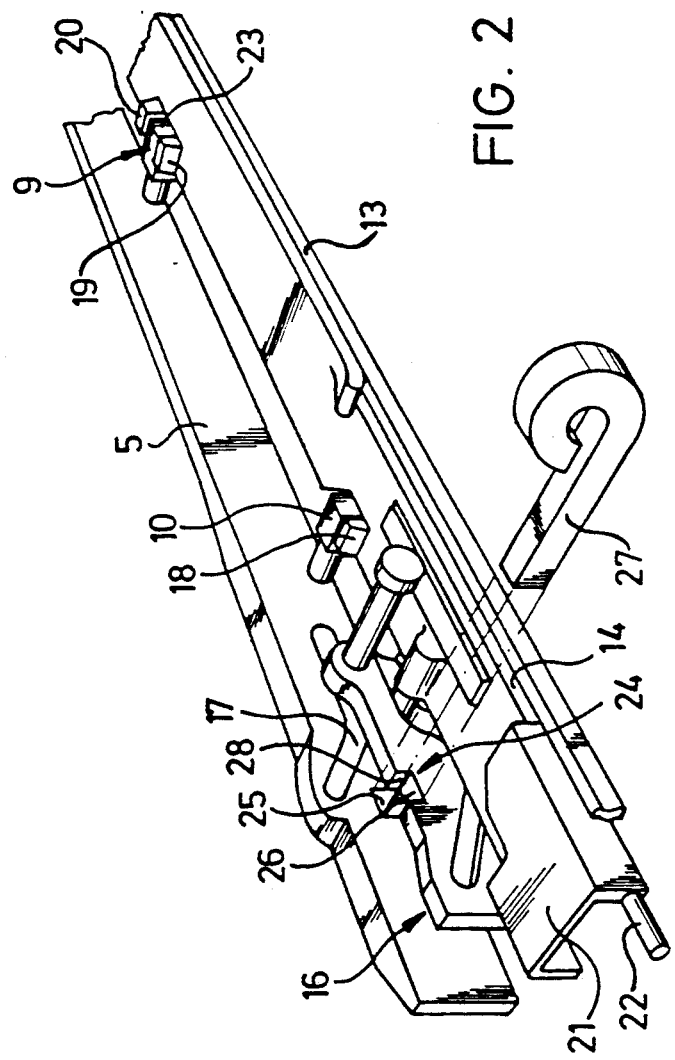
FIG. 2 is a partial view in perspective of a motor vehicle sliding roof illustrating details of the adjustment mechanism according to the invention.

In FIG. 2 of the drawing, corresponding parts are designated by the same reference numerals as in FIG. 1; however, the left-to-right orientation has been reversed (i.e., front hold-down device 9 is now on the right end). In this perspective view, mounting mechanism 16 is shown in more detail.

Mounting mechanism 16 is movably carried on a guide block 21, to which it is movably connected. Guide block 21 is mounted to slide lengthwise in the guide channel 14 formed by guide rail 13. A drive element, such as a rigid drive cable 22, is connected to guide block 21 and is moved with the help of a drive mechanism which not represented in further detail and is of any conventional design; see, for example, U.S. Pat. No. 4,332,416. Thus, the guide block 21 is slaved to move with displacement of the drive cable 22.

In FIG. 2, the adjustment mechanism on guide block 21 is shown in the closed position corresponding to the position represented in solid lines in FIG. 1. A guiding pin 23, which is formed by the lug of quadrilateral or square cross section of front hold-down device 9, is fixed so as to be positively locked against movement in opening 11 between guide parts 19, 20. In this way, link part 5, and with it cover 4, is kept in the closed or zero position.

During assembly of sliding-lifting roof 1, mounting mechanism 16 is, now, also to be aligned with respect to cover 4 and link part 5 for the zero position shown in FIG. 2. For this alignment, there is provided an adjustment mechanism, designated overall by 24 that comprises, in the example represented, a through-opening 25 provided in link part 5 near mounting mechanism 16, a fitting recess 26 on mounting mechanism 16, and an adjustment part 27. In the illustrated embodiment, fitting recess 26 is made as a U-shaped indentation 28 on the top side of mounting mechanism 16, and the through-opening 25 on link part 5 has a quadrilateral cross section. Adjustment part 27 is in the form of an adjustment pin that, also, has a quadrilateral cross section and is complementarily shaped to match the fitting recess 26.

If, as indicated in dashed lines in FIG. 2, adjustment part 27 engages in the U-shaped indentation 28 on mounting mechanism 16, and goes through through-opening 25 on link part 5, mounting mechanism 16 is in the predetermined position, i.e. in the zero position to link part 5, and is, thus, aligned with cover 4.

As can be seen from FIG. 2, the parts of adjustment mechanism 24 are located at a point that is easily accessible during installation of sliding-lifting roof 1. Additionally, the mounting mechanism 16 is hardly weakened by the small notch-like fitting recess 26 that is provided in it, so that it can also be made in a suitably compact way, i.e., does not have to be enlarged due to the presence of the recess 26.

The adjustment process with such an adjustment mechanism 24 is also simplified, essentially, because link part 5 with associated cover 4 is already fixed in the zero position with the help of front hold-down device 9, so that, with the help of adjustment mechanism 24, only mounting mechanism 16 needs to be lined up with respect to cover 4 or link part 5. The guide block 21, coupled with mounting mechanism 16, then, also assumes, in this lined-up position, the zero position, and the unillustrated drive elements can be brought into meshing engagement with the rigid drive cable 22 connected to guide block 21. With the help of adjustment mechanism 24, the work necessary for the zero position adjustment can, thus, be performed simply and quickly during assembly of sliding-lifting roof 1.

Although the invention is explained based on a sliding-lifting roof 1 as an example, the adjustment mechanism 24, as described above can, also, be advantageously used in a sliding roof for zero position adjustment, i.e., in a motor vehicle roof in which cover 4 can be brought out of the zero position, shown in FIG. 1 in solid lines, into the lowered position shown in a dashed line, after which it can, then, be moved lengthwise in guide channel 14 along guide rail 13 underneath stationary roof part 2, to gradually expose roof opening 3, but cannot assume the upwardly tilted orientation shown in dot-dash lines. In this case, guide block 21 can be lined up with respect to the cover or to its link part 5, which are fixed against movement in their lengthwise direction in a predetermined position, with the help of adjustment mechanism 24.

We claim:

1. Roof for motor vehicles with a cover that is guided on lateral guide rails, and a rear end of the cover being able to at least be lowered from a roof opening in a stationary roof surface by a mounting mechanism, with which the cover is slid beneath the stationary roof part, said cover carrying a hold-down device near front and rear edge areas on each of opposite lateral sides thereof for holding said cover down due to coaction with a fixed roof part when it is displaced from a closed position, each rear and front hold-down device coacting with a respective guideway on a respective one of the guide rails in the closed position for providing guidance against longitudinal movement of the cover, and with an adjustment mechanism for the positional alignment of the cover and mounting mechanism in the closed position of the cover, wherein one of the hold-down devices, in the closed position of cover, is fixed relative to sliding in a lengthwise direction of the roof, and wherein said adjustment mechanism serves as a means by which said mounting mechanism is alignable relative to the cover, which is fixed in the lengthwise direction by said one of the hold-down devices, by temporarily interlocking said mounting mechanism with said cover and fixing them in only a single, predetermined position relative to each other and in a manner which is disengageable for normal operation on the roof.

2. Roof for motor vehicles according to claim 1, wherein the adjustment mechanism comprises an alignment opening going through a part that is fixed to the cover, said alignment opening being at a location near the mounting mechanism, a fitting recess on the mounting mechanism and associated with the alignment opening, and an adjustment part which coacts with the alignment opening and fitting recess.

3. Roof for motor vehicles according to claim 2, wherein the part that is fixed to the cover is a link; wherein the alignment opening is a through-opening formed in a said link which is provided on each side of the cover.

4. Roof for motor vehicles according to claim 3, wherein the through-opening is quadrilaterally shaped and the fitting recess is a U-shaped indentation.

5. Roof for motor vehicles according to claim 4, wherein the fitting recess is provided on a top side of the mounting mechanism.

6. Roof for motor vehicles according to claim 5, wherein, in the closed position of the cover, each front hold-down device is received in a positively locking way in said respective guideway formed between guide parts on the guide rail.

7. Roof for motor vehicles according to claim 6, wherein each front hold-down device has an approximately quadrilateral cross section.

8. Roof for motor vehicles with a cover that is guided on lateral guide rails, and a rear end of the cover being able to at least be lowered from a roof opening in a stationary roof surface by a mounting mechanism and slid beneath the stationary roof part, said cover carrying a hold-down device near front and rear edge areas on each of opposite lateral sides thereof for holding said cover down when it is displaced from a closed position, each rear and front hold-down device coacting with a respective guideway on a respective one of the guide rails in the closed position of the cover, and with an adjustment mechanism for the positional alignment of the cover and mounting mechanism in the closed position of the cover; wherein the front hold-down device, in the closed position of cover, is fixed relative to sliding in a lengthwise direction of the roof, and wherein said adjustment mechanism serves as a means by which said mounting mechanism is alignable relative to the cover, which is fixed in the lengthwise direction by said front hold-down device; wherein the adjustment mechanism comprises an alignment opening going through a part that is fixed to the cover, said alignment opening being at a location near the mounting mechanism, a fitting recess on the mounting mechanism and associated with the alignment opening, and an adjustment part which coacts with the alignment opening and fitting recess wherein the fitting opening is quadrilaterally shaped and the fitting recess is a U-shaped indentation.

9. Roof for motor vehicles according to claim 2, wherein the fitting recess is provided on a top side of the mounting mechanism.

10. Roof for motor vehicles according to claim 2, wherein, in the closed position of the cover, each front hold-down device is received in a positively locking way in said respective guideway formed between guide parts on the guide rail.

11. Roof for motor vehicles according to claim 10, wherein each front hold-down device has an approximately quadrilateral cross section.

12. Roof for motor vehicles according to claim 3, wherein the fitting recess is provided on a top side of the mounting mechanism.

13. Roof for motor vehicles according to claim 3, wherein, in the closed position of the cover, each front hold-down device is received in a positively locking way in said respective guideway formed between guide parts on the guide rail.

14. Roof for motor vehicles according to claim 3, wherein each front hold-down device has an approximately quadrilateral cross section.

15. Roof for motor vehicles according to claim 1, wherein, in the closed position of the cover, each front hold-down device is received in a positively locking way in said respective guideway formed between guide parts on the guide rail.

16. Roof for motor vehicles according to claim 15, wherein each front hold-down device has an approximately quadrilateral cross section.

17. Roof according to claim 1, wherein the roof is a sliding-lifting roof in which the cover is also selectively upwardly raisable at a rear end so as to create a ventilation gap between the stationary roof part and the rear end of the cover which is disposed above it, and wherein said mounting mechanism is a swing-out lever of a cover raising mechanism.

18. Roof for motor vehicles according to claim 17, wherein, in the closed position of the cover, each front hold-down device is received in a positively locking way in said respective guideway formed between guide parts on the guide rail.

19. Roof for motor vehicles according to claim 18, wherein each front hold-down device has an approximately quadrilateral cross section.

* * * * *